(12) United States Patent
Kluwe et al.

(10) Patent No.: US 6,432,169 B1
(45) Date of Patent: Aug. 13, 2002

(54) METHOD AND PROCESS FOR DRYING GAS

(75) Inventors: Torben Kluwe, Deimenhorst; Erich Kock, Bremen; Matthias Schmidt, Brehna, all of (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/595,614

(22) Filed: Jun. 16, 2000

(30) Foreign Application Priority Data

Jun. 17, 1999 (DE) .......................... 199 27 595

(51) Int. Cl.⁷ .................. B01D 53/04; B01D 53/22; B01D 53/26
(52) U.S. Cl. ................. 95/52; 95/91; 95/117; 96/4; 96/10; 96/118; 96/135
(58) Field of Search ............................ 95/52, 117, 118, 95/120, 126; 96/4, 8, 10, 13, 14, 118, 130, 135

(56) References Cited

U.S. PATENT DOCUMENTS

| | | | | | |
|---|---|---|---|---|---|
| 1,881,490 A | * | 10/1932 | Gmelin et al. | ............... | 96/4 X |
| 2,976,950 A | * | 3/1961 | Smith | ........................ | 95/117 |
| 3,242,641 A | * | 3/1966 | Makin, Jr. | ..................... | 95/117 |
| 3,303,105 A | * | 2/1967 | Konikoff et al. | ............. | 96/4 X |
| 4,040,805 A | * | 8/1977 | Nelms et al. | .................... | 96/4 |
| 4,208,371 A | * | 6/1980 | Kring | ........................ | 96/10 X |
| 4,497,640 A | * | 2/1985 | Fournie et al. | ............. | 95/52 X |
| 4,528,003 A | * | 7/1985 | Dittrich et al. | .................. | 96/4 |
| 4,556,180 A | * | 12/1985 | Manatt | ........................ | 96/8 X |
| 4,612,019 A | * | 9/1986 | Langhorst | ...................... | 95/52 |
| 4,718,921 A | * | 1/1988 | Makino et al. | ................. | 95/52 |
| 4,875,908 A | * | 10/1989 | Kikukawa et al. | ............. | 95/52 |
| 4,898,599 A | * | 2/1990 | Settlemyer | ................. | 95/126 X |
| 4,909,810 A | * | 3/1990 | Nakao et al. | ................ | 96/10 X |
| 5,429,662 A | * | 7/1995 | Fillet | ........................ | 95/117 X |
| 5,464,466 A | * | 11/1995 | Nanaji et al. | ................. | 96/4 X |
| 5,575,832 A | * | 11/1996 | Boyd | ........................ | 95/118 X |
| 6,126,724 A | * | 10/2000 | Martin et al. | .................... | 96/4 |

FOREIGN PATENT DOCUMENTS

| | | | | |
|---|---|---|---|---|
| DE | 38 18919 A1 | 12/1989 | ........... | B01D/53/22 |
| DE | 40 00 297 C2 | 8/1994 | ........... | B65D/90/34 |
| DE | 197 04 637 A1 | 8/1998 | ........... | B60T/17/00 |
| EP | 0 323 431 A2 | 7/1989 | ........... | B01D/53/26 |
| JP | 60-235624 | * 10/1985 | ................ | 95/52 |
| JP | 05-177111 | * 7/1993 | ................ | 95/52 |

* cited by examiner

Primary Examiner—Robert H. Spitzer
(74) Attorney, Agent, or Firm—Pendorf & Cutliff

(57) ABSTRACT

The invention is concerned with a device and a process for drying air in ventilation devices for fuel tanks and gas drying in fuel tanks via vapor permeable membranes and sorbents.

19 Claims, No Drawings

METHOD AND PROCESS FOR DRYING GAS

BACKGROUND OF THE INVENTION

1. Field of the Invention

The invention is concerned with a process for drying of gas filling devices for fuel tanks and with a device for drying the gas comprising the gaseous volume in a fuel tank, as well as a process for drying of gas.

2. Description of the Related Art

In fuel tanks, coincidentally with the withdrawal of fluids, the volume of the withdrawn fuel is replaced by gas, and gas tanks are conventionally ventilated by ambient air. The in-flowing external air always contains an amount of water as vapor component which, depending upon the degree of saturation, can in the course of variations of the ambient temperature achieve a relative humidity of 100%, and can condense.

This problem is particularly serious, for example, in the operation of airplanes, wherein a condensation of water vapor occurs in the area of the tank during flying as a consequence of the enormous temperature variations during flying. The enriched water component leads to reduction of the exergetic effectiveness during combustion of the airplane fuel (kerosene) and to corrosion of the inside of the tank. As counter measures, various coatings for the tank inner area have been proposed for corrosion protection, which however, with respect to construction, have a high expense, in particular in joints. In the employment of CFK (carbon fiber composite), the effect of moisture can even lead to a reduction of the material quality.

SUMMARY OF THE INVENTION

In order to solve principally the problem of water contamination of the airplane fuel, systems exist, which pump water out of the fuel tank after the condensation thereof.

Until now, a system of this type is known for example from reference EP 0 278 755 A2, which in the airplane tank in pockets enriched water via a pumping mechanism admixes into the fuel stream. This water/fuel mixture is, via a propulsion pump, advanced to the propulsion system and in this manner the water component is eliminated along with the combustion process. These systems essentially serve specifically to withdraw the condensed water out of the tank and do not prevent the collection of water in the overall tank volume.

A more sensible arrangement or solution would be on the one hand to reduce or suppress the water vapor content of the incoming air by a suitable measure and, if necessary, to supplementally dry the gaseous component situated in the tank.

In the technical realm, the cold process or the over-pressurization of gases for drying of air are known. For technical reasons, these processes are however exclusively realized for drying of gases in stationary ground operations.

The cold process and the over-pressurization are already technically established technologies, which however above all for reasons of high apparatus complexity and the there-from resulting weight problem certainly cannot contribute to the solving of the problem of drying of air in airplanes.

The cooling process represents the oldest drying technology for air drying. Therein one cools the compressed air using a cooling machine to the value below the saturation temperature. The lower the pressure dew point is to be, the greater the number of parallel coolers necessary therefore. Should for example a pressure dew point of below 2° C. be achieved, then parallel operation of two coolers is necessary, since in temperatures of below 0° the cooling surfaces can ice-over and subsequently must be thawed out. For the continuous operation, this means a periodic mode of operation of the individual dryers. The air saturated at 2° C. is subsequently counter-current warmed with the incoming air so that a saturation of approximately 30% can be achieved at environmental temperature.

As further, technically already realized processes, there is the over-pressurization process, in which the air is densified by increasing pressure. Thereby, the partial pressure of the water vapor increases, until the saturation vapor pressure is achieved and condensation of the water vapor begins. Subsequently, the air is again cooled off to operating temperature, whereby a part of the water vapor condenses. The de-pressurization of the compressed air to the operating pressure brings about a further pressure dew point reduction. Since the compression of great gas volume streams is very cost intensive, the described drying methodology is suitable only for small volume flows. Analogously to the drying process using cooling machines, the technical equipment necessary is extensive, from which the employment in aircraft operation, above all for reasons of weight, again appears unlikely.

All until now known methods for gas drying lead to complex technical solutions, which have as a consequence a high weight. In particular in the transport area and in particular in the air and space these have provided until now no solution to the reduction of water component in the fuel tank.

DETAILED DESCRIPTION OF THE INVENTION

The invention is thus concerned with the task, of providing a device, with which the condensation of water vapor in fuel tanks can be prevented as well as a process associated therewith.

The invention includes a device for drying air in ventilation devices for fuel tanks, in which in the air flow of the ventilation device vapor, permeable membranes are provided in such a manner, that the air only flows over or via one selected or predetermined surface of the membrane (here characterized or named the front side).

In the same way, this device can be employed for drying of gas in the gas volume in the fuel tank, wherein at the fuel tank a withdrawal and a return system for production of a gas flow is provided, and in the gas flow vapor permeable membranes are provided in such a manner that the air flows over the front side of the membranes.

The vapor permeable membranes are constructed as composite membrane systems, comprised of a carrier membrane for mechanical stabilization and a separation active layer of polymers, preferably of cellulose ether, cellulose sulfates, or polyvinyl alcohols.

On the back side of the vapor permeable membrane, there is provided in certain cases a further layering or bed or packing of sorbents for storage of the water component.

The vapor permeable membranes are constructed as plates, compact hollow fibers, or wrapped modules. The inventive devices are particularly suitable for employment in fuel tanks for air and space travel.

A further device for drying of air in ventilation devices for fuel tanks is a flow-throughable module provided in an air flow of the ventilation device, with sorbents for separation of the water component.

Likewise, this device can be employed for drying of gas, of the gas volume in the fuel tank, wherein also then on the fuel tank a system for achievement of a gas flow is employed and a module with sorbents for separation of the water components is provided through which the gas stream flows.

The module is constructed as a cassette with a gas permeable jacketing and sorbent packing.

The sorbents are comprised of absorbents, for example silica gel, activated aluminum oxide, zeolite. The zeolites exhibit porosities between 5 and 15 nanometers. Finer porosities require too high a pressure loss of the absorber and provide too small a capacity for receiving of water. In zeolites with greater pore diameters, too many kerosene components penetrate, which results at least partially in rendering the material hydrophobic. A pore diameter of approximately 10 nanometers has been found to be particularly suitable.

The sorbents can also be comprised of solid absorbent, for example the so-called super absorbent cellulose compounds, or lithium chloride, calcium chloride, phosphorpentoxide, or a fluid absorbent, for example lithium chloride solutions, sulfuric acid, glycols.

In the process for drying of air in the ventilation device for fuel tanks using vapor permeable membranes, the air flow of the ventilation system is conducted or conveyed over the vapor permeable membrane, wherein the water component to be separated permeates through the membranes, accumulates in the permeate, and in certain cases is bound, and the dried air in the retentate is directed back to the tank. In the same manner, in place of membranes it is also possible to employ cassettes with absorbent fillings flowed through by the air stream, in which the water component to be separated is bound using adsorption or also absorption.

In the process for gas drying in fuel tanks by means of vapor permeable membranes, gases are withdrawn from the tank, and this gas stream is conducted over the vapor permeable membranes. The water component to be separated permeates through the membranes and is accumulated in the permeate and, in certain cases, is bound. The dried gas in the retentate is directed back to the tank. Likewise there can be employed in place of the membranes again cassettes with sorbents flowed through by the air stream.

A particular advantage of the invention is comprised in the weight reduction in comparison to the technical solutions which can be found in the state of the art. Therewith, the membrane and sorption processes, due to their low apparatus complexity and costs, represent an ideal problem solution for the drying of air particularly in the transportation industry and in particular in air and space travel. The result of investigations has shown that, for example, in an airplane tank, the water component can accumulate up to 1 Vol. % in the kerosene and thus the drying of air with the objective of the prevention of water vapor accumulation and condensation in the tank represents a substantial factor in weight reduction.

In the following, the invention will be described in detail on the basis of advantageous embodiments.

In the sorption process (adsorption and absorption), the water component contained in the air is variously bound by the sorbent, as a rule physisorptively. Thereby, depending upon the sorption material or means, dew points of from −30 to −100° C. can be achieved. Silica gel ($SiO_2$), activated aluminum oxide ($\gamma$-$Al_2O_3$) and the so-called molecular sieves (zeolites) are among the most usable absorbents.

Besides the adsorbents, the drying of air can be carried out using absorption to solid or fluid absorbents. For this, one can employ lithium chloride (LiCl), calcium chloride ($CaCl_2$) and phosphorpentoxide ($P_4O_{10}$). Fluid absorbents include lithium chloride solutions, sulfuric acids ($H_2SO_4$) and glycols.

The regeneration in operation of the absorption and adsorption dryer occurs using temperature or pressure change processes. Likewise, a exchange-out of used-up materials can occur. It is to be presumed from the constructive requirements that solid absorbents are to be preferred over liquids in the airplane.

One group of new adsorbents is the so-called super adsorbents, which frequently are based on cellulose compounds such as hydrophilic cellulose ethers. The group of hydrophilic cellulose ethers includes compounds such as hydroxyethyl cellulose, hydroxypropyl cellulose, and hydroxypropylmethyl cellulose as well as polyacrylamide. Especially the last-mentioned compounds provide as a consequence of their high sorption capacity when in the form of packings and composite membranes a particularly economical variation or variant, in particular in applications in the air and space travel. This can be realized in the form of a module, which is directly integrated in the ventilation tube of the airplane tank. Preferably in this embodiment, adsorbents are employed in powder form.

The modules can, if desired be warmed. This serves for regeneration of the adsorbent packings and to avoid the icing thereof. For this, hot water conduits or pipes can be employed, or heat conduits which convey air tapped from the turbines of the airplane, or electric heating systems.

Prior to the entry into the module, a pre-separation is realized. This serves for protection of the module from dirt and dust. It is achieved in the simplest manner as, a filter or cyclone. The pre-separation can be operationally connected with the module. It is however also possible, that this pre-separation not be included in the module unit. Thus, for practical reasons, it is useful to install at the opening of the ventilation tube to the atmosphere one or more filters. Therein, the accumulations on the filter can be removed via a back wash device at the filter, for example using compressed air. Such a pre-separation is particularly advantageous during starting and landing since in these operating phases larger amounts of dust are stirred up.

In the case of all ad- and absorbents, for employment of the invention in airplanes, the materials are preferably integrated in a module as a packing. The moist external or ambient air penetrating-in during operation of the airplane then flows through the sorbent packing prior to entry into the tank area. Thereby, the water vapors are sorptively bound. The air leaves the module almost completely dried and is further conveyed to the tank whereby a subsequent condensation of water vapor in the airplane tank is prevented or precluded. After a certain operation time, there occurs either a regeneration of the sorbent by input of thermal energy or by pressure change adsorption or a replacement in the form of an exchangeable cassette. If different sorbents are employed, then these are spatially separated from each other. This serves for prevention of concurrent sorption or as the case may be de-sorption processes. At the same time, these sorbent separations simplify the regeneration of the sorbents.

The separation principal of highly selective vapor permeable membranes is based on the various solubilities (sorptions) and diffusion co-efficients of the feed components in the membrane matrix. From this it follows that the employed membranes must follow the solution diffusion mechanism.

For technical and economical reasons, it is always useful to separate the rapidly permeable components, present in small concentrations, from the feed. This means, that in the inventive design the water vapor molecule permeates through the membrane and accumulates in the permeate. The further air components ($N_2$, $O_2$, and $CO_2$) form the retentate which is conveyed to the tank.

For technical realization, there can be considered composite membranes with hydrophilic separation or boundary layers of polymers such as cellulose ethers, cellulose sulfates, or polyvinyl alcohols. Composite membrane systems are comprised of, as a rule, a symmetric carrier membrane, which can be for example a polymer or ceramic membrane, which serves for mechanical stabilization of the membrane system, and a separation active layer, which faces the feed to be prepared.

This separation layer matrix is alone responsible for the material transport and for the selectivity of the composite membrane. As a consequence of the multi-layer construction, there can, upon appropriate or suitable selection of the asymmetric carrier membrane, composite membranes be employed in pressure differentials of greater than 100 bar.

In contrast to sorption, in the case of vapor permeation, a vacuum must supplementally be applied to the permeate side, from which a partial pressure differential—as the driving force of the process—results. This vacuum forms the basis for the achievement of the desired water removal from the dried air. Technically this vacuum can be realized for example via a simple vacuum pump or via a purge gas stream. Compared to sorption, the separated water or water vapor must be further treated. The condensed water can be released to the environment or can be stored in a small tank. Analogously to sorption, it is recommended -that the module be warmed, which will prevent an icing within the module.

Advantageously membranes are also integrated in the module, wherein, for example, for the air operations, besides plates above all the compact hollow fiber and wrapped modules, which are characterized by a high compactness, have been proven to be of advantage.

The conducting or directing of the flow of the gas or as the case may be air can occur in various ways depending upon the operational environment. In the start or landing phase—that is when close to the ground—the gas is directed over the modules, regardless whether it is a membrane or sorbent module. At greater altitudes, the flow guide occurs via a bypass. Both paths can be switched to be blocked or opened, for example via blocking valves. If the bypass is blocked, so then the gas must flow through the module. If the module path is blocked, then the gas must flow through the bypass.

The blocking of the module on both sides at greater altitudes prevents on the one hand the desorption of the water as a consequence of the pressure drop and the entry thereof into the tank as well as on the other hand the passage of kerosene vaporized as a consequence of a pressure drop out of the tank in the module, which would lead to rendering the sorbents hydrophobic. Besides this, the bypass guarantees the maintenance of high reliability requirements of air traffic (danger of plugging up of the adsorbers).

The blocking of the bypass in the vicinity of the ground ensures the forced guidance of the gas through the module and thus the drying thereof. This is not necessary in greater heights with corresponding low temperatures due to minimal water vapor content of the air present there.

The modules—regardless of which type—are integrated with a quick closure system in the flow guidance of the gas, or as the case may be, air. This quick closure system makes possible a simple and quick change out.

After successful separation of the water vapor, a storage and/or condensation of the water must occur. Here the series of hydrophilic cellulose ethers can be employed, which tend to thermal aggregation. Among the mentioned cellulose ethers there exists a series of compounds, above all the hydroxypropyl celluloses, which are characterized by an inverse solubility, and therewith sorption or as the case may be diffusion relationship, with respect to the water molecules with changing process temperature. In these polymers, one finds with increasing process temperature a lowering of the solubility and a reduction of the sorption and diffusion capacity of the water molecules in the polymer matrix. So there occurs beginning at a certain temperature an almost sudden release of the sorptive bound water molecules. Conventional temperatures are between 30 and 70° C. Therewith it is possible, by increasing the temperature, to initiate a water separation out of the cellulose ether matrix. The separated water can be collected at the base of the module and when desired, released. Heating can occur by means of one of the systems described with respect to the sorbeht modules.

The removal of the condensed water from the polymer matrix occurs, besides the described case of a membrane with specific separation active cellulose ether layer, also for cellulose ether packings with the already above-described ad- or absorbtives.

Practical experiments for air drying of vapor saturated air, which by means of vapor permeable membranes and the super adsorbent hydroxyethyl and hydroxypropyl cellulose were carried out, yielded a selectivity between water vapor and air of 10,000. This means, that the water molecule permeates at least 10,000 times more rapidly through the membrane or as the case may be adsorber than the air.

What is claimed is:

1. Process for gas drying of the gas volume in aircraft fuel tanks, comprising providing a withdrawal and return guide system at the aircraft fuel tank for production of a gas flow, and providing vapor permeable membranes with front and back sides in the gas flow in such a manner that air flows over the membrane front side.

2. Process for drying of air in ventilation devices for fuel tanks by means of vapor permeable membranes, wherein the air stream of the ventilation device is directed over the vapor permeable membrane, wherein the water component to be separated permeates through the membrane and is accumulated in the permeate, and the dried air in the retentate is directed to the tank.

3. Process for air or gas drying in fuel tanks by means of vapor permeable membranes according to claim 2, wherein the permeation flow through the membrane is supported or aided by a vacuum device.

4. Process for drying gas in fuel tanks by means of vapor permeable membranes, wherein, gases are withdrawn from the tank, this gas stream is directed over the vapor permeable membrane, whereby the water component to be separated permeates through the membrane and is accumulated in the permeate, and the gas in the retentate is returned to the tank.

5. Process for drying air having a water component in ventilation devices for fuel tanks by means of sorbents, comprising directing a flow of air from the ventilation device over these sorbents to cause the water component to be bound and retained in the sorbent, and returning the dried air to the fuel tank.

6. Process for drying gas in fuel tanks by means of sorbents, comprising withdrawing gases from the tank, forming the withdrawn gases into a gas stream and directing the gas stream over the sorbents, whereby the water component to be removed is bound, and directing the gas with water component removed back to the tank.

7. Device for drying air in ventilation units for aircraft fuel tanks, wherein at least one vapor permeable membrane having front and back sides is provided in an air stream of the aircraft fuel tank ventilation unit, such that air only flows over the front side of the membrane and such that moisture is removed from said air stream.

8. Device according to claim 7, wherein the vapor permeable membrane is a composite membrane system, comprised of a carrier membrane for mechanical stabilization and a separation active layer of polymers.

9. Device according to claim 8, wherein the separation active layer is comprised of polymers and super adsorbents.

10. Device according to claim 8, wherein the separation active layer is comprised of a material selected from the group consisting of cellulose ether, cellulose sulfate, or polyvinyl alcohol.

11. Device according to claim 8, wherein on the back side of the vapor permeable membrane a further layer of sorbents is provided for storage of the water component.

12. Device according to claim 7, wherein the vapor permeable membrane is constructed as plate, compact hollow fiber, or wrapped module.

13. Device according to claim 7, wherein said device is preceded by a filter or cyclonic separator.

14. Device according to claim 7, wherein said device is incorporated in an airplane.

15. Device for drying air in ventilation devices for aircraft fuel tanks, wherein, flow-through modules with sorbents for separation of the water component are provided in the air flow of the ventilation device.

16. Device according to claim 15, wherein the module is constructed as cassette with gas permeable jacket and sorbent packing.

17. Device according to claim 15, wherein said sorbents are adsorbents selected from the group consisting of silica gel, activated aluminum oxide, and zeolite.

18. Device according to claim 15, wherein the sorbent is a solid absorbent selected from the group consisting of cellulosic compounds, lithium chloride, calcium chloride, phosphorpentoxide or a fluid absorbents selected from the group consisting of lithium chloride solutions, sulfuric acid, and glycol.

19. Device for gas drying of the gas volume in an aircraft fuel tank, wherein, at the aircraft fuel tank, a system for production of a gas flow is provided and in the gas flow, flow-through module with sorbents for separation of the water component is provided.

* * * * *